United States Patent
Wang et al.

(10) Patent No.: US 9,001,867 B2
(45) Date of Patent: Apr. 7, 2015

(54) METHOD AND APPARATUS FOR MANAGING INTERFERENCE IN FULL-DUPLEX COMMUNICATION

(71) Applicant: QUALCOMM Incorporated, San Diego, CA (US)

(72) Inventors: Hua Wang, Basking Ridge, NJ (US); Achaleshwar Sahai, Houston, TX (US); Zrinka Puljiz, Austin, TX (US); Shailesh Patil, Bridgewater, NJ (US); Pablo Alejandro Anigstein, Gillette, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 13/766,099

(22) Filed: Feb. 13, 2013

(65) Prior Publication Data
US 2014/0226538 A1     Aug. 14, 2014

(51) Int. Cl.
| | |
|---|---|
| H04B 1/00 | (2006.01) |
| H04B 1/10 | (2006.01) |
| H04B 7/06 | (2006.01) |
| H04W 28/04 | (2009.01) |
| H04J 11/00 | (2006.01) |
| H04L 25/03 | (2006.01) |
| H04B 17/00 | (2006.01) |
| H04B 7/155 | (2006.01) |
| H04B 1/7107 | (2011.01) |
| H04B 7/04 | (2006.01) |

(52) U.S. Cl.
CPC .... *H04B 1/1027* (2013.01); *H04L 2025/03426* (2013.01); *H04B 7/0617* (2013.01); *H04W 28/04* (2013.01); *H04B 17/005* (2013.01); *H04B 7/15585* (2013.01); *H04B 1/7107* (2013.01); *H04B 7/0413* (2013.01); *H04B 1/10* (2013.01); *H04W 28/048* (2013.01); *H04J 11/0036* (2013.01)

(58) Field of Classification Search
None
See application file for complete search history.

(56) References Cited

U.S. PATENT DOCUMENTS

| | | | |
|---|---|---|---|
| 7,570,921 B2 | 8/2009 | Sugar et al. | |
| 2004/0052305 A1* | 3/2004 | Olson et al. | 375/148 |
| 2004/0121827 A1* | 6/2004 | Murakami et al. | 455/575.7 |
| 2005/0032521 A1 | 2/2005 | Lee et al. | |

(Continued)

FOREIGN PATENT DOCUMENTS

| | | |
|---|---|---|
| WO | 2007060229 A1 | 5/2007 |
| WO | 2011087227 A2 | 7/2011 |

OTHER PUBLICATIONS

Rakovic, et al., "Clustered Network Coordinated Beamforming for Cooperative Spectrum Sharing of Multiple Secondary Systems", ACM ISBN 978-1-4503-0912-7, CogART, 2011, 5 pgs.

(Continued)

*Primary Examiner* — Faruk Hamza
*Assistant Examiner* — Andrew Oh
(74) *Attorney, Agent, or Firm* — Arent Fox LLP

(57) ABSTRACT

A method, an apparatus, and a computer program product for wireless communication are provided. The apparatus receives an intended signal from a first wireless device operating in a full-duplex mode, receives an interfering signal from a second wireless device communicating with the first wireless device, and reduces an interference of the received intended signal caused by the interfering signal by projecting a matrix of the received intended signal onto a space associated with the interfering signal.

20 Claims, 11 Drawing Sheets

(56) References Cited

U.S. PATENT DOCUMENTS

| | | |
|---|---|---|
| 2007/0121766 A1* | 5/2007 | He .................................. 375/346 |
| 2007/0155336 A1 | 7/2007 | Nam et al. |
| 2011/0026632 A1 | 2/2011 | Wight |
| 2011/0130090 A1 | 6/2011 | Kwak et al. |
| 2011/0299407 A1 | 12/2011 | Saito et al. |
| 2011/0310827 A1 | 12/2011 | Srinivasa et al. |
| 2012/0236736 A1* | 9/2012 | Frank et al. ................... 370/252 |
| 2012/0307649 A1 | 12/2012 | Park et al. |
| 2013/0089040 A1* | 4/2013 | Tabet et al. ................... 370/329 |

OTHER PUBLICATIONS

Hou X., et al., "Adaptive Multi-Tx Multi-Rx MIMO Transmission Scheme for LTE-Advanced Downlink", Global Telecommunications Conference, 2009. Globe Com 2009. IEEE, IEEE, Piscataway, NJ, USA, Nov. 30, 2009, pp. 1-7, XP031646025, ISBN: 978-1-4244-4148-8, III Adaptive MTMR MIMO Transmission Scheme With Partial Cooperation.

International Search Report and Written Opinion—PCT/US2014/014928—ISA/EPO—Jun. 10, 2014.

\* cited by examiner

METHOD AND APPARATUS FOR MANAGING INTERFERENCE IN FULL-DUPLEX COMMUNICATION

BACKGROUND

1. Field

The present disclosure relates generally to communication systems, and more particularly, to a method and apparatus for managing interference in full-duplex communication.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives an intended signal from a first wireless device operating in a full-duplex mode, receives an interfering signal from a second wireless device communicating with the first wireless device, and reduces an interference of the received intended signal caused by the interfering signal by projecting a matrix of the received intended signal onto a space associated with the interfering signal.

In another aspect, a method, a computer program product, and an apparatus are provided. The apparatus receives a first signal from a first wireless device operating in a full-duplex mode, receives a second signal from a second wireless device communicating the second signal to the first wireless device, the first wireless device receiving the second signal concurrently with transmitting the first signal on a same carrier frequency, the second signal being received concurrently with the first signal on the same carrier frequency, the second signal being an interfering signal, and reduces an interference of the received first signal caused by the interfering signal by projecting a matrix of the received signal onto a space associated with the interfering signal.

DETAILED DESCRIPTION

Figure 1:
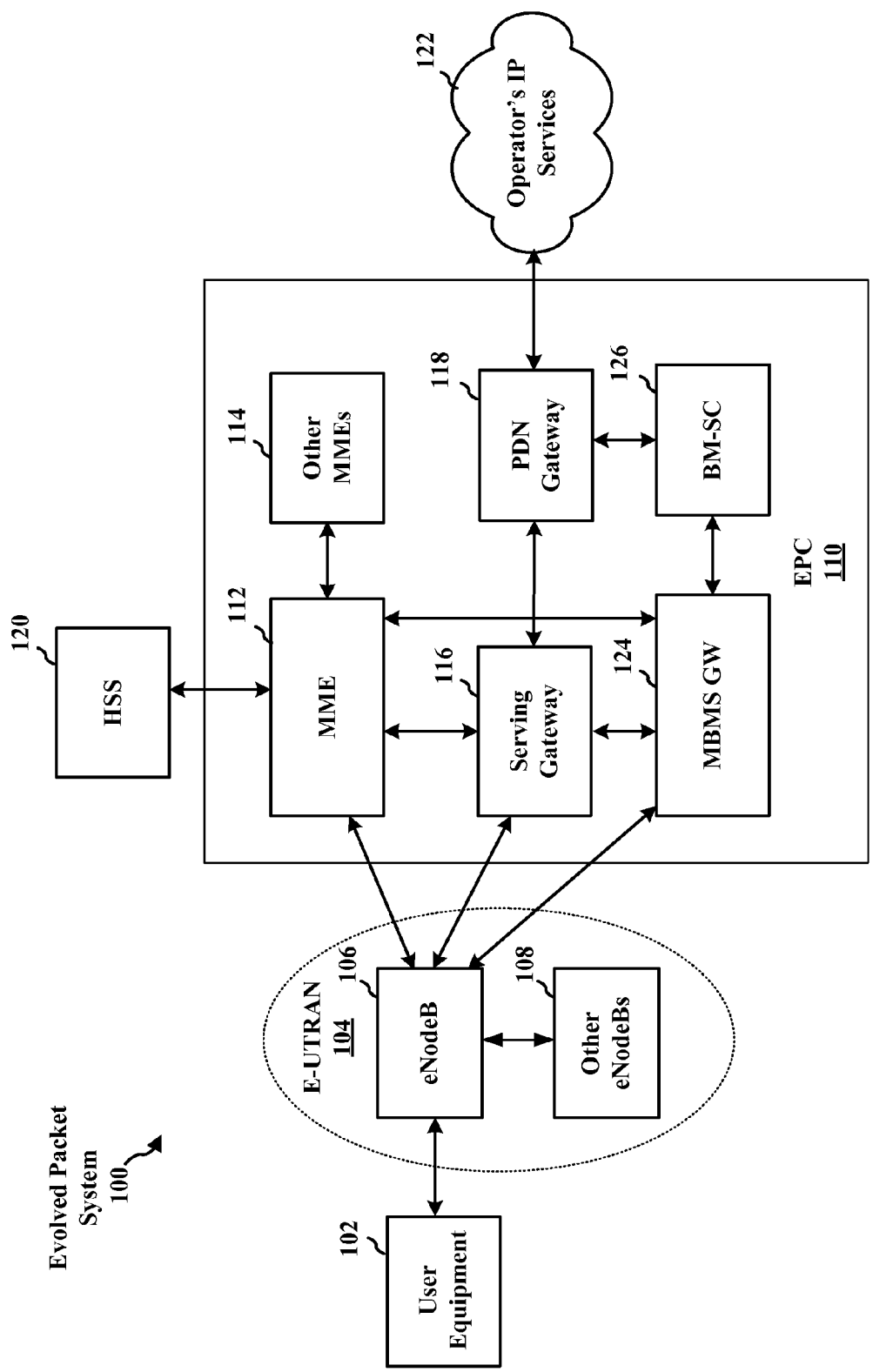
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
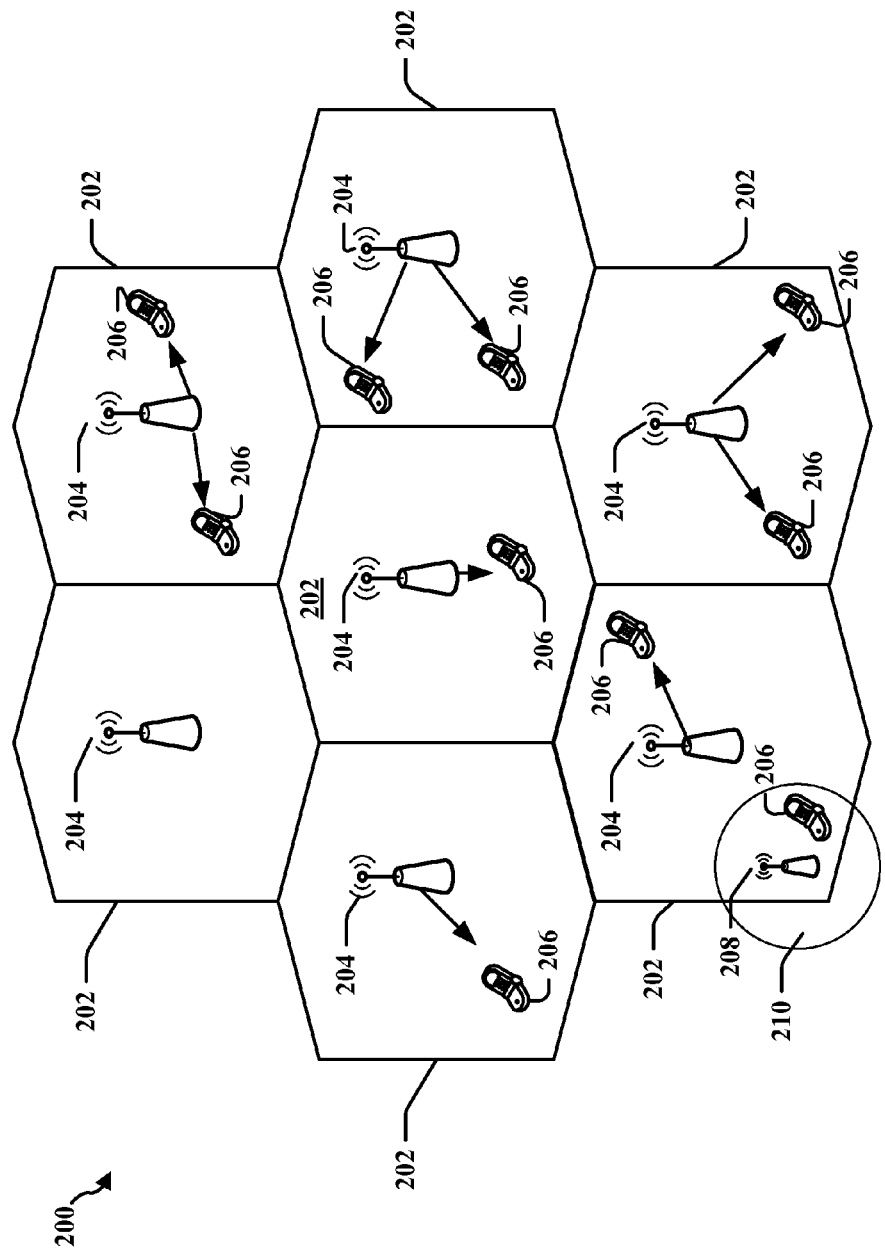
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
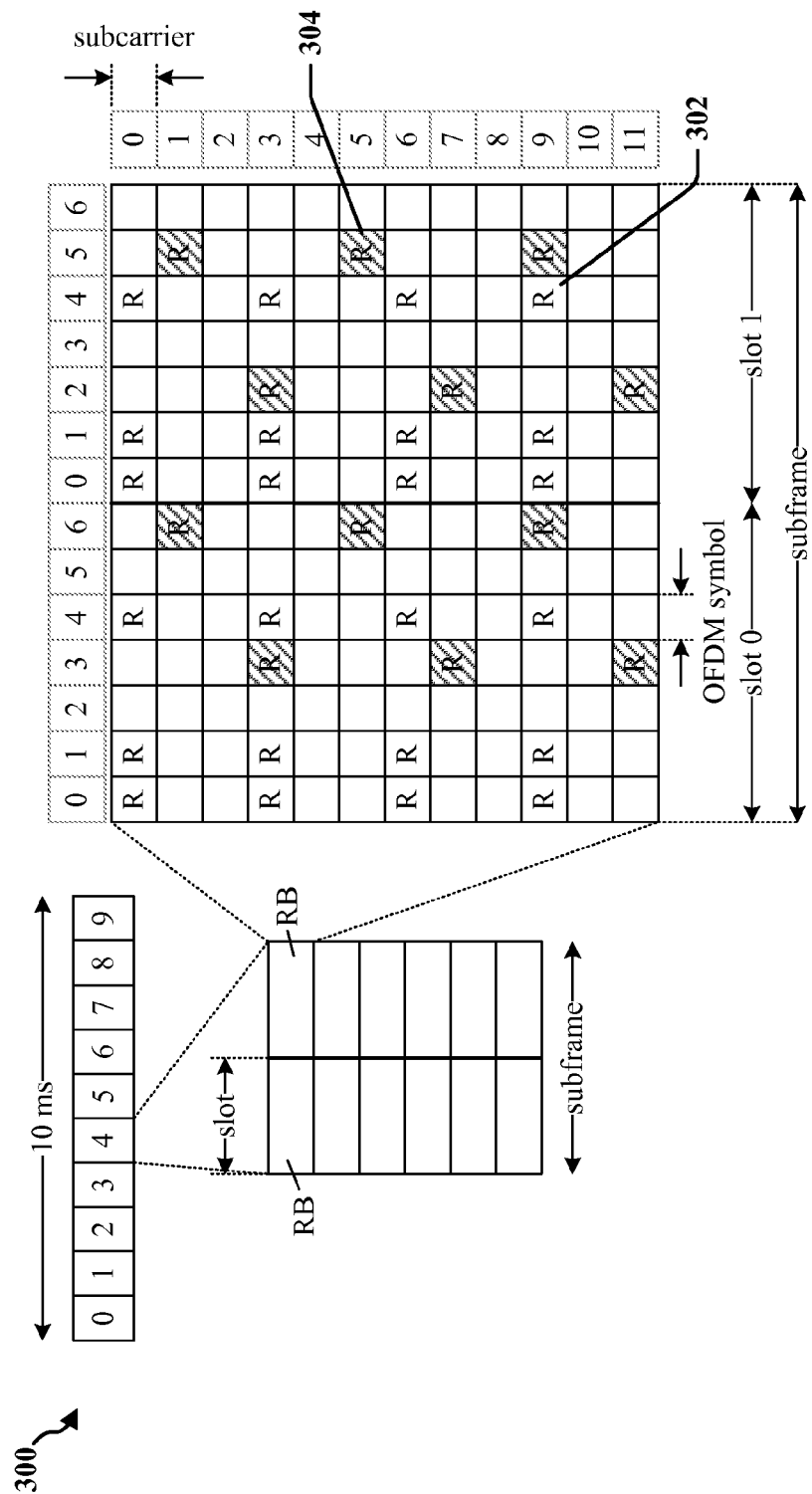
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
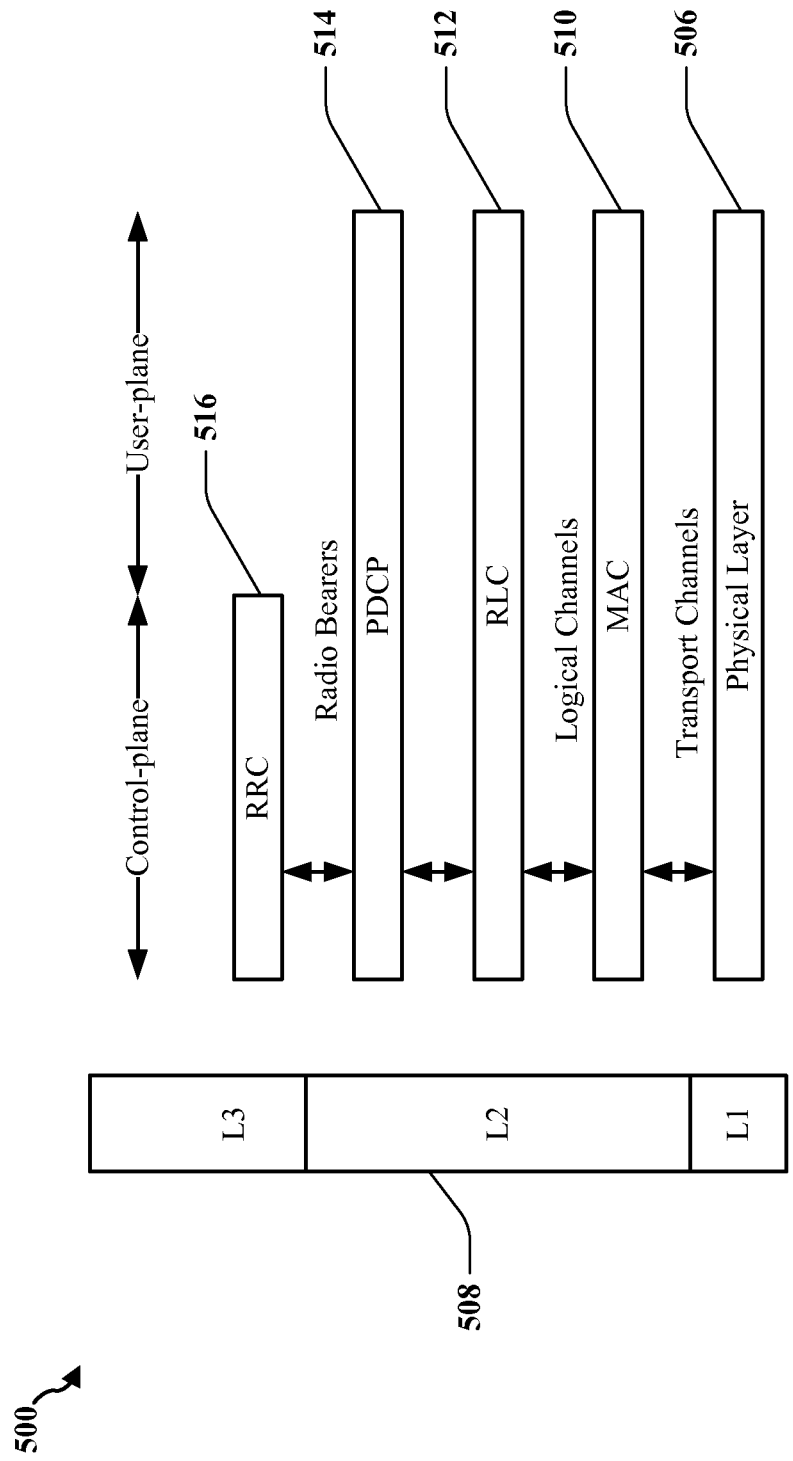
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
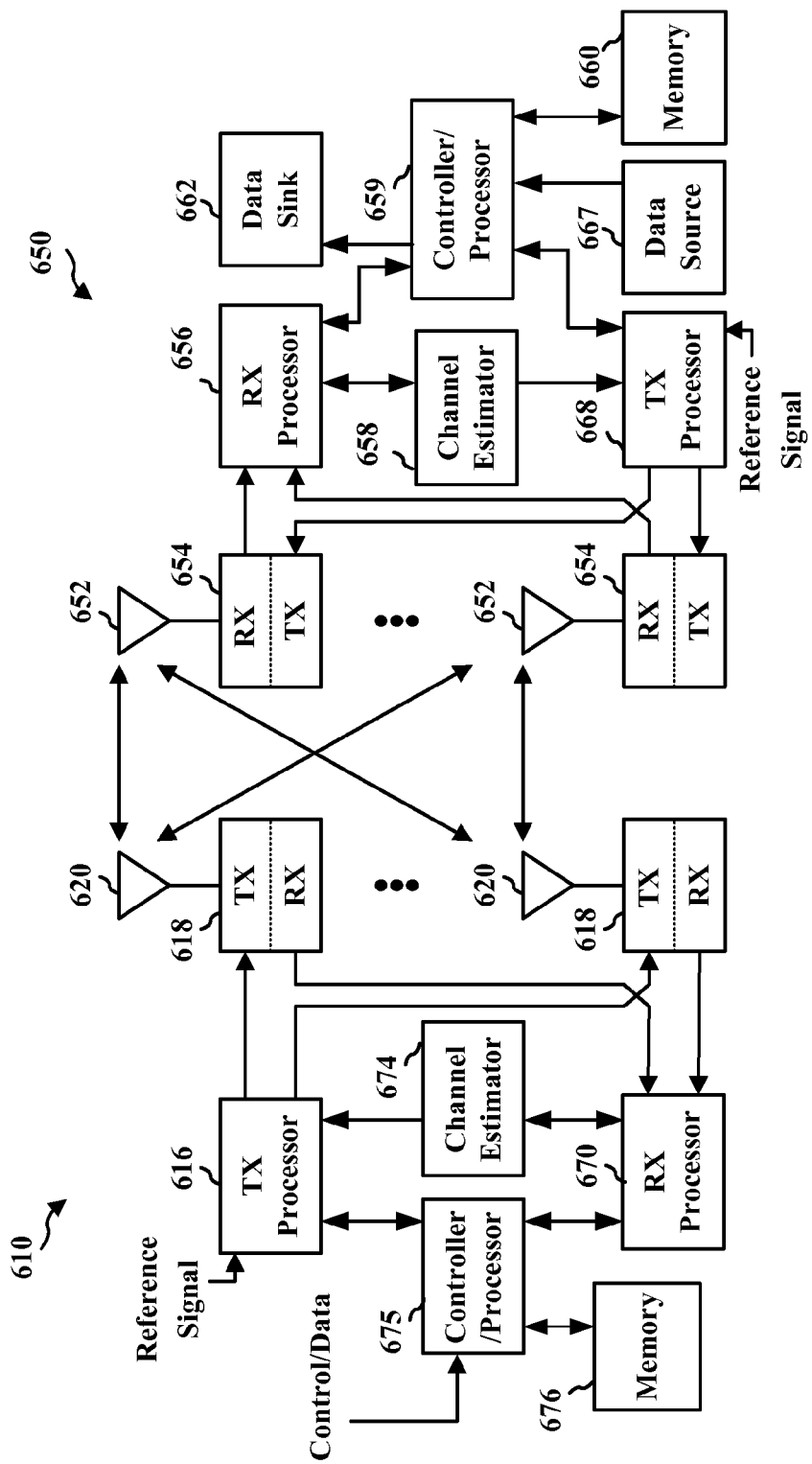
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In full duplex communication, a node (also referred to as an "access point") may concurrently receive and transmit signals on the same time and frequency resources. For example, an access point may receive signals from a first UE and concurrently transmit signals to a second UE. Since the access point knows the signals transmitted to the second UE, the access point may cancel such signals transmitted to the second UE at its receiver to decode the signals received from the first UE.

Full-duplex communication may provide several advantages. For example, full-duplex communication may double throughput. However, throughput may be doubled only if the self-interference in a full-duplex configuration may be completely canceled. Moreover, full duplex communication may maximize throughput at the physical layer if the full-duplex node has both data to transmit and data to receive. Often, due to the asymmetric nature of data traffic, the possibility of an exchange of data between two full-duplex nodes may rarely occur. For example, an optimal situation for using full-duplex communication is when an access point is to receive data from the first UE and to concurrently transmit data to the second UE.

Figure 7:
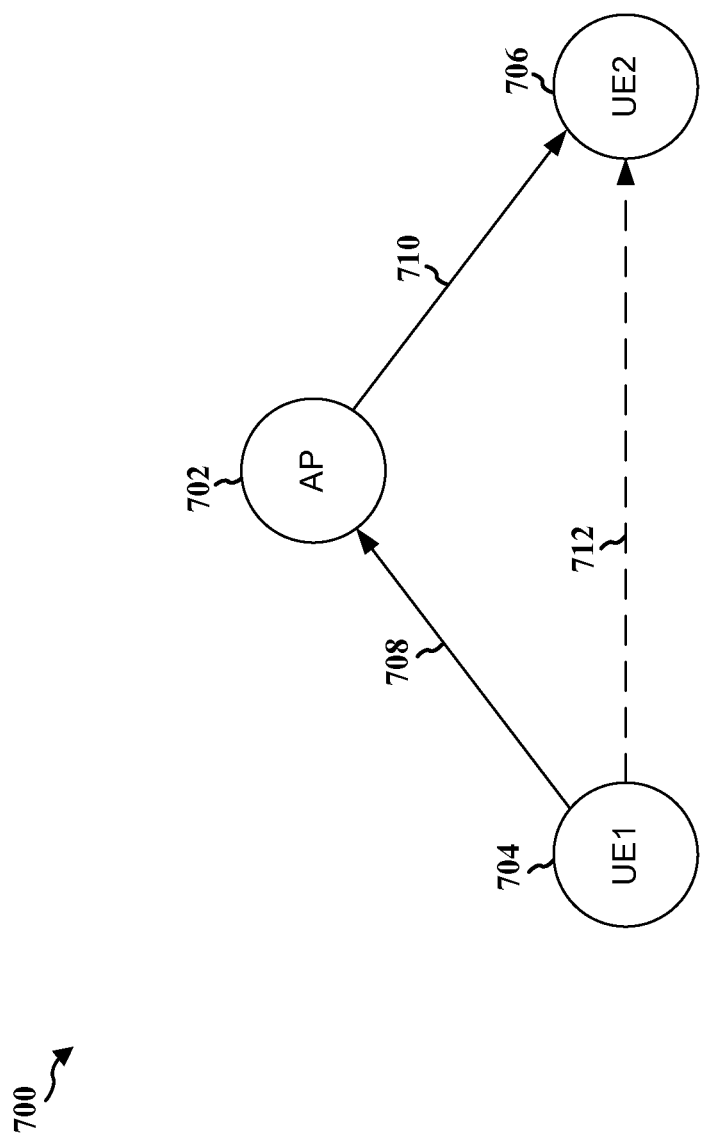
FIG. 7 is a diagram illustrating a full-duplex communication.

FIG. 7 is a diagram 700 illustrating a full-duplex communication. FIG. 7 includes access point (AP) 702, UE1 704, and UE2 706. As shown in FIG. 7, the AP 702 receives an uplink data signal 708 from UE1 704 and concurrently transmits a downlink data signal 710 to UE2 706. In the configuration of FIG. 7, the uplink data signal 708 and the downlink data signal 710 are transmitted using the same channel (e.g., the same carrier frequency). Full-duplex communication may be beneficial if traffic on both the uplink data signal 708 and the downlink data signal 710 may be simultaneously supported.

One of the challenges in supporting concurrent uplink and downlink transmissions in a full-duplex mode of operation is interference at the downlink receiver (e.g., interfering signal 712 received at UE2 706) due to the transmission of uplink signals (e.g., uplink data signal 708 transmitted by UE1 704). As shown in FIG. 7, since AP 702, UE1 704, and UE2 706 are all wireless devices, the uplink data signal 708 from UE1 704 to AP 702 causes interference (e.g., interfering signal 712) at UE2 706. Often, the strength of the interference at the receiver of UE2 706 can be significantly larger than the receiver noise at UE2 706. The downlink data rate may therefore be limited by the amount of interference. Unlike self-interference, the interference at the UE2 706 is due to a signal (e.g., interference signal 712 resulting from the uplink data signal 708) that is not known to the UE2 706. Therefore, managing the interference at the receiver of the UE2 706 may be critical for proper full-duplex mode of operation. As discussed infra, interference of the downlink data signal 710 received by the UE2 706 caused by the interfering signal 712 may be reduced by projecting a matrix of the received downlink data signal 710 onto a space associated with the interfering signal 712.

The UEs 704 and 706 may include multiple antennas for receiving and sending transmissions. For example, the UE1 704 may have n transmit antennas and the UE2 706 may have m receive antennas. The AP 702 may transmit and receive using full-duplex communication with r transmit/receive antennas. Since the maximum rank of the channel between the UE1 704 and the AP 702 is min(n,r), the UE1 704 can transmit min(n,r) independent streams and still achieve the maximum multiplexing gain. The AP 702 needs to transmit only min(r,m) independent streams of data in downlink. The downlink receiver (i.e., UE2 706) has m antennas to receive and, therefore, the downlink receiver has m degrees of freedom.

In an aspect, the UE2 706 may manage interference to the received downlink data signal 710 caused by the interfering signal 712 by nulling a part of the interfering signal 712. Such nulling may be achieved if the total degrees of freedom occupied by the interfering signal 712 are less than m. This may be due to the fact that min(n,r)<m. Another reason for the interfering signal 712 to have less than m degrees of freedom is that the channel between the UE1 704 and the UE2 706 is not full rank. Therefore, in one configuration, the UE2 706 may null the interference caused by the interfering signal 712 by projecting the received downlink data signal 710 onto the orthogonal space of the interfering signal 712.

For example, with reference to FIG. 7, the UE1 704 may have n transmit antennas, the UE2 706 may have n receive antennas, and the AP 702 may have a single full-duplex antenna. The UE2 706 may reduce interference to the received downlink data signal 710 caused by the interfering signal 712 by determining an estimate of the channel gain between its intended transmitter (i.e., AP 702) and itself (i.e., UE2 706). Such channel gain may be represented by a matrix H. The UE2 706 may also determine an estimate of the channel gain between the uplink transmitter (i.e., UE1 704) and itself (i.e., UE2 706). Such channel gain may be represented by a matrix G. In an aspect, the UE2 706 may estimate the channel gains H and G by listening to one or more training signals transmitted by each of the transmitters UE1 704 and AP 702.

Since the UE2 706 concurrently receives the downlink data signal 710 and the interfering signal 712, the signal detected by UE2 706 may be considered to be a combination of the downlink data signal 710, the interfering signal 712, and noise. Such a signal received by the UE2 706 may be represented by a vector y. For example, l may represent a column vector of length n, and g may represent the product of matrix G and the vector l (i.e., g=G*l). If the signal y received by the UE2 706 is projected onto a sub-space (i.e., a nullspace) which is perpendicular to g, the interference to the downlink data signal 710 caused by the interfering signal 712 may be nulled.

For example, UE1 704 may have two antennas, UE2 706 may have two antennas, and AP 702 may have one antenna. The downlink data signal 710 may be represented by x, the uplink data signal 708 may be represented by w, and noise may be represented by z. Accordingly, H, G, w, and z may be defined as follows:

$$H = \begin{bmatrix} h_1 \\ h_2 \end{bmatrix}, G = \begin{bmatrix} g_{11} & g_{12} \\ g_{21} & g_{22} \end{bmatrix}, w = \begin{bmatrix} s_1 \\ s_2 \end{bmatrix}, z = \begin{bmatrix} z_1 \\ z_2 \end{bmatrix},$$

where $s_1=s_2=s$. In the present example, H has a length of two because UE2 706 has two receive antennas and AP 702 has one transmit antenna. The element $h_1$ of matrix H represents the channel gain between the single antenna of AP 702 and the first antenna of UE2 706, and the element $h_2$ of matrix H represents the channel gain between the single antenna of AP 702 and the second antenna of UE2 706. The element $g_{11}$ of matrix G represents the channel gain between the first antenna of UE1 704 and the first antenna of UE2 706, the element $g_{12}$ of matrix G represents the channel gain between the first antenna of UE1 704 and the second antenna of UE2 706, the element $g_{21}$ of matrix G represents the channel gain between the second antenna of UE1 704 and the first antenna of UE2 706, and the element $g_{22}$ of matrix G represents the channel gain between the second antenna of UE1 704 and the second antenna of UE2 706. The element $s_1$ of matrix w represents the signal transmitted by the first antenna of UE1 704 and the element $s_2$ of matrix w represents the signal transmitted by the second antenna of UE1 704. The element $z_1$ of matrix z represents noise at the first antenna of UE2 706 and the element $z_2$ of matrix z represents noise at the second antenna of UE2 706. The signal y received at UE2 706 may be represented as follows:

$$\begin{bmatrix} y_1 \\ y_2 \end{bmatrix} = \begin{bmatrix} h_1 \\ h_2 \end{bmatrix} x + \begin{bmatrix} g_{11} & g_{12} \\ g_{21} & g_{22} \end{bmatrix} \begin{bmatrix} s_1 \\ s_2 \end{bmatrix} + \begin{bmatrix} z_1 \\ z_2 \end{bmatrix}$$

$$= \begin{bmatrix} h_1 \\ h_2 \end{bmatrix} x + \begin{bmatrix} g_{11} & g_{12} \\ g_{21} & g_{22} \end{bmatrix} \begin{bmatrix} 1 \\ 1 \end{bmatrix} s + \begin{bmatrix} z_1 \\ z_2 \end{bmatrix}$$

$$= \begin{bmatrix} h_1 \\ h_2 \end{bmatrix} x + \begin{bmatrix} g_{11} + g_{12} \\ g_{21} + g_{22} \end{bmatrix} s + \begin{bmatrix} z_1 \\ z_2 \end{bmatrix}.$$

Therefore, y=Hx+gs+z, where $$g = \begin{bmatrix} g_{11} + g_{12} \\ g_{21} + g_{22} \end{bmatrix} = \begin{bmatrix} g_1 \\ g_2 \end{bmatrix}.$$

Therefore, in order to null the interference in the received signal y, the UE2 706 may multiply y by g*, where g*=[−g$_2$ g$_1$], as shown in equation (1):

$$g^*y = g^*Hx + g^*z. \quad \text{(equation 1)}$$

In another aspect, the UE2 706 may manage interference to the received downlink data signal 710 caused by the interfering signal 712 by suppressing the interference to maximize the signal to interference-plus-noise ratio (SINR) of the downlink data signal 710. In such aspect, the minimum mean-squared error (MMSE) solution may be used to determine the appropriate space onto which a signal received by the UE2 706 may be projected.

For example, the UE2 706 may determine an estimate of the channel gain between its intended transmitter (e.g., AP 702) and itself (e.g., UE2 706). As previously discussed, such channel gain may be represented as the matrix H. The UE2 706 may also determine an estimate of the channel gain between the uplink transmitter (e.g., UE1 704) and itself (e.g., UE2 706). As previously discussed, such channel gain may be represented by the matrix G. In an aspect, the UE2 706 may estimate the channel gains H and G by listening to one or more training signals transmitted by each of the transmitters UE1 704 and AP 702. During full-duplex communication, since the UE2 706 concurrently receives the downlink data signal 710 and the interfering signal 712, the signal detected by UE2 706 may be considered to be a combination of the downlink data signal 710, the interfering signal 712, and noise. Such a signal received by the UE2 706 may be represented by the vector y. The space onto which y may be projected to maximize the SINR of the downlink data signal 710 is given by the projection vector $H^*(pxgg^H + \sigma^2 I)^{-1}$, where $\sigma^2$ is the variance of the noise at the receiver, I is the identity matrix, p is the power of the interfering signal, and $g^H$ is the Hermite conjugate of g. For example, g may represent the product of matrix G and a vector l (i.e., g=G*l), where the vector l may represent the column vector of length n.

As previously discussed, the signal y received by the UE2 706 may be represented as y=Hx+gs+z. The terms gs+z may be treated as noise with variance matrix $pxgg^H + \sigma^2 I$. Therefore, the signal y may be multiplied by $H^*(pxgg^H + \sigma^2 I)^{-1}$ to determine the MMSE estimator that maximizes the SINR of the downlink data signal 710.

Figure 8:
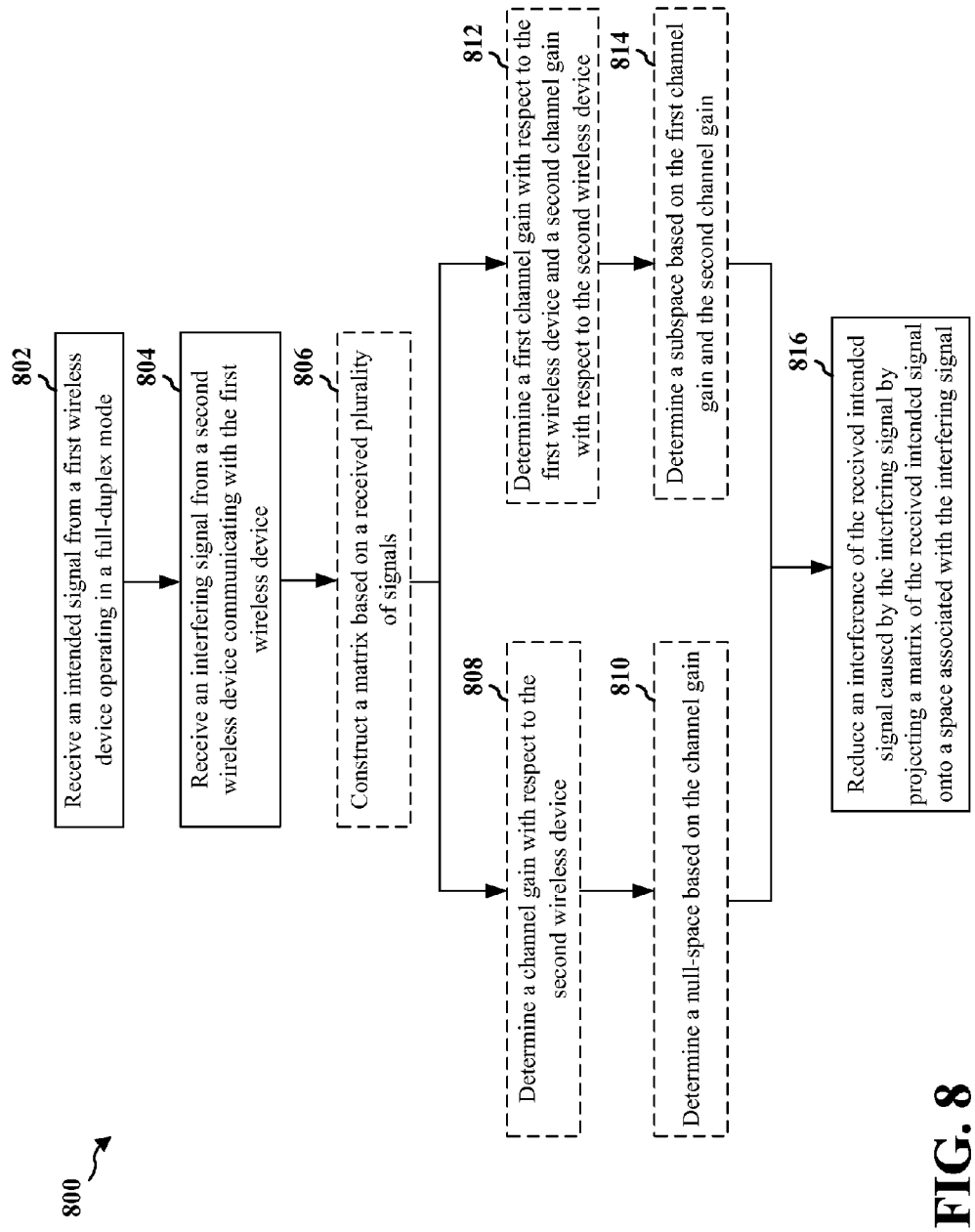
FIG. 8 is a flow chart of a method of wireless communication.

FIG. 8 is a flow chart 800 of a method of wireless communication. The method may be performed by a UE. At step 802, the UE receives an intended signal from a first wireless device operating in a full-duplex mode. For example, with reference to FIG. 7, the UE2 706 may receive the downlink data signal 710 from the AP 702. The received intended signal (e.g., the downlink data signal 710) may include two or more signals received from different sets of antennas of the first wireless device.

At step 804, the UE receives an interfering signal from a second wireless device communicating with the first wireless device. The interfering signal may be received concurrently with the received intended signal. The interfering signal and the received intended signal may be received on the same carrier frequency. For example, with reference to FIG. 7, the UE2 706 may receive interfering signal 712 from UE1 704 concurrently while receiving the downlink data signal 710 from the AP 702. In such example, the interfering signal 712 and the downlink data signal 710 may be received on the same carrier frequency. In one configuration, the interfering signal 712 may be the same signal as the uplink data signal 708.

At step 806, the UE constructs a matrix based on two or more received signals. For example, with reference to FIG. 7, the downlink data signal 710 may be two or more signals received from different sets of antennas of the AP 702. It should be noted that since the UE2 706 concurrently receives the downlink data signal 710 and the interfering signal 712, the signal detected by UE2 706 may be considered to be a combination of the downlink data signal 710, the interfering signal 712, and noise. Such a signal received by the UE2 706 may be represented by a vector y.

At step 808, the UE determines a channel gain with respect to the second wireless device. For example, with reference to FIG. 7, the UE2 706 may determine an estimate of the channel gain between UE1 704 and itself (e.g., UE2 706). Such channel gain may be represented by a matrix G. For example, the matrix G may be defined as $$G = \begin{bmatrix} g_{11} & g_{12} \\ g_{21} & g_{22} \end{bmatrix}.$$

In an aspect, the UE2 706 may estimate the channel gain G by listening to one or more training signals transmitted by the UE1 704.

At step 810, the UE determines a nullspace based on the channel gain. For example, if the UE2 706 has n receive antennas, l may represent a column vector of length n, and g may represent the product of matrix G and the vector l (i.e., g=G*l). For example, g may be defined as $$g = \begin{bmatrix} g_{11} + g_{12} \\ g_{21} + g_{22} \end{bmatrix} = \begin{bmatrix} g_1 \\ g_2 \end{bmatrix}.$$

The nullspace may be a matrix g* that is perpendicular to g. For example, the matrix g* may be defined as g*=[−g$_2$ g$_1$].

At step 812, the UE determines a first channel gain with respect to the first wireless device and a second channel gain with respect to the second wireless device. For example, with reference to FIG. 7, the UE1 704 may have n transmit antennas, the UE2 706 may have n receive antennas, and the AP 702 may have a single full-duplex antenna. The UE2 706 may determine an estimate of the channel gain between its intended transmitter (i.e., AP 702) and itself (i.e., UE2 706). Such channel gain may be represented by a matrix H. The UE2 706 may also determine an estimate of the channel gain between the uplink transmitter (i.e., UE1 704) and itself (i.e., UE2 706). Such channel gain may be represented by a matrix G. In an aspect, the UE2 706 may estimate the channel gains H and G by listening to one or more training signals transmitted by each of the transmitters UE1 704 and AP 702. For example, the matrix H may be defined as $$H = \begin{bmatrix} h_1 \\ h_2 \end{bmatrix}$$

and the matrix G may be defined as $$G = \begin{bmatrix} g_{11} & g_{12} \\ g_{21} & g_{22} \end{bmatrix}.$$

At step 814, the UE determines a subspace based on the first channel gain and the second channel gain. The subspace may be defined as $H^*(pxgg^H + \sigma^2 I)^{-1}$, where H is the first channel gain, p is the power of the interfering signal, g is the second channel gain, $g^H$ is the Hermite conjugate of g, I is the identity matrix, and $\sigma^2$ is the variance of noise at a receiver. For example, if the UE2 706 has n receive antennas, l may represent a column vector of length n, and g may represent the product of matrix G and the vector l (i.e., g=G*l). For example, g may be defined as $$g = \begin{bmatrix} g_{11} + g_{12} \\ g_{21} + g_{22} \end{bmatrix} = \begin{bmatrix} g_1 \\ g_2 \end{bmatrix}.$$

At step 816, the UE reduces an interference of the received intended signal caused by the interfering signal by projecting a matrix of the received intended signal onto a space associated with the interfering signal. In an aspect, the space may be the nullspace. In such aspect, in order to null the interference in the received signal y, the UE2 706 may multiply y by g*, where g*=[-g_2 g_1] as shown in equation (1). In another aspect, the space may be the subspace, the subspace being configured to increase a signal to interference-plus-noise ratio (SINR). In such aspect, the signal y received by UE2 706 may be represented as y=Hx+gs+z. The terms gs+z may be treated as noise with variance matrix $p \times gg^H + \sigma^2 I$. Therefore, the signal y may be multiplied by $H^*(p \times gg^H + \sigma^2 I)^{-1}$ to determine the MMSE estimator that maximizes the SINR of the downlink data signal 710.

Figure 9:
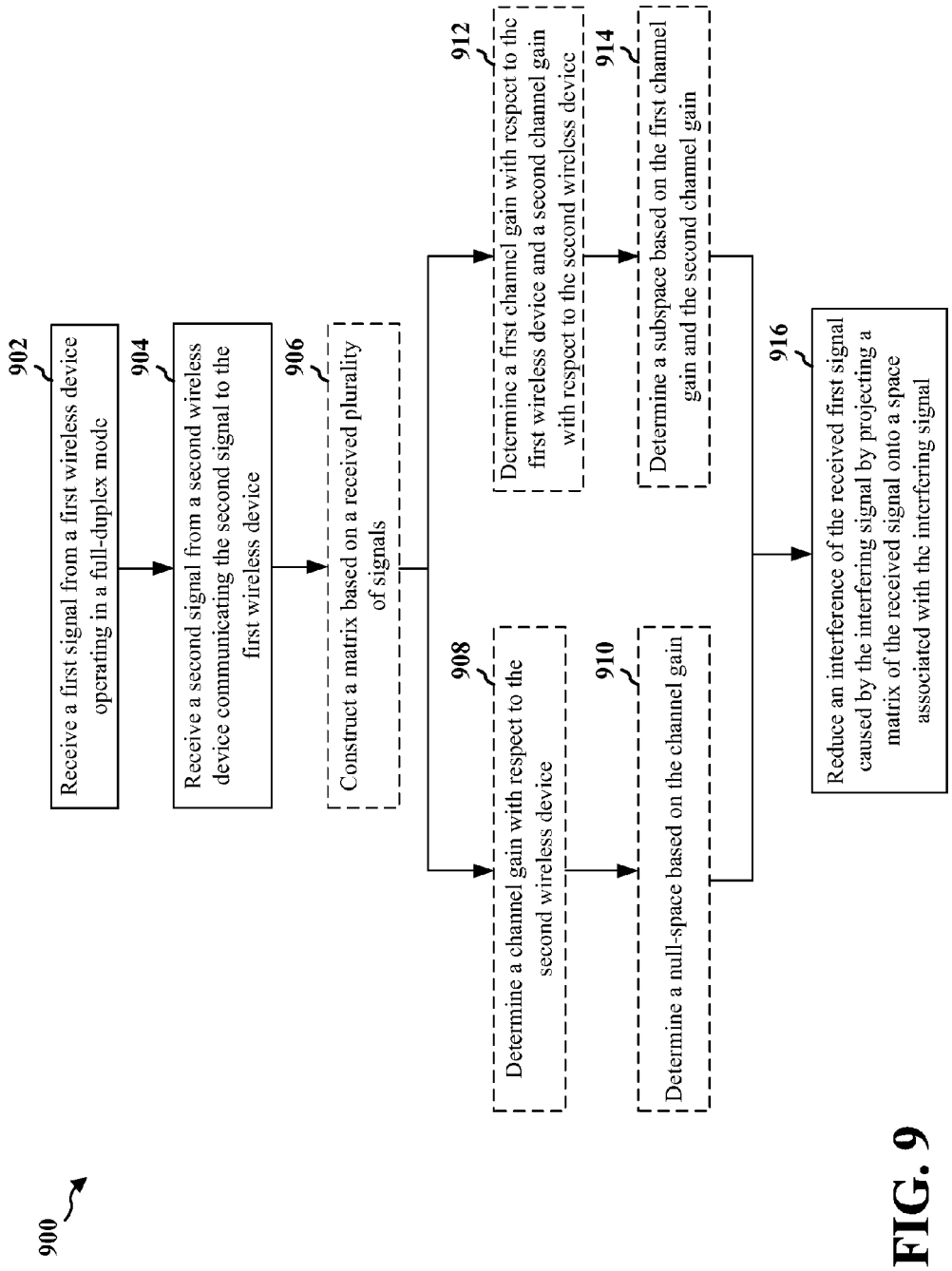
FIG. 9 is a flow chart of a method of wireless communication.

FIG. 9 is a flow chart 900 of a method of wireless communication. The method may be performed by a UE. At step 902, the UE receives a first signal from a first wireless device operating in a full-duplex mode. For example, with reference to FIG. 7, the UE2 706 may receive the downlink data signal 710 from the AP 702. The received first signal may include two or more signals received from different sets of antennas of the first wireless device.

At step 904, the UE receives a second signal from a second wireless device communicating the second signal to the first wireless device. For example, with reference to FIG. 7, the UE2 706 may receive the uplink data signal 708 from the UE1 704 communicating the uplink data signal 708 to the AP 702. The first wireless device may receive the second signal concurrently with transmitting the first signal on a same carrier frequency. For example, with reference to FIG. 7, the AP 702 may receive the uplink data signal 708 concurrently with transmitting the downlink data signal 710 on the same carrier frequency. The second signal may be an interfering signal and may be received concurrently with the first signal on the same carrier frequency. For example, the uplink data signal 708 may be received by the UE2 706 as the interfering signal 712, where the interfering signal 712 is received concurrently with the downlink data signal 710 on the same carrier frequency.

At step 906, the UE constructs a matrix based on two or more received signals. For example, with reference to FIG. 7, the downlink data signal 710 may be two or more signals received from different sets of antennas of the AP 702. It should be noted that since the UE2 706 concurrently receives the downlink data signal 710 and the interfering signal 712, the signal detected by UE2 706 may be considered to be a combination of the downlink data signal 710, the interfering signal 712, and noise. Such a signal received by the UE2 706 may be represented by a vector y.

At step 908, the UE determines a channel gain with respect to the second wireless device. For example, with reference to FIG. 7, the UE2 706 may determine an estimate of the channel gain between UE1 704 and itself (e.g., UE2 706). Such channel gain may be represented by a matrix G. For example, the matrix G may be defined as $$G = \begin{bmatrix} g_{11} & g_{12} \\ g_{21} & g_{22} \end{bmatrix}.$$

In an aspect, the UE2 706 may estimate the channel gain G by listening to one or more training signals transmitted by UE1 704.

At step 910, the UE determines a nullspace based on the channel gain. For example, if the UE2 706 has n receive antennas, l may represent a column vector of length n, and g may represent the product of matrix G and the vector l (i.e., g=G*l). For example, g may be defined as $$g = \begin{bmatrix} g_{11} + g_{12} \\ g_{21} + g_{22} \end{bmatrix} = \begin{bmatrix} g_1 \\ g_2 \end{bmatrix}.$$

The nullspace may be a matrix g* that is perpendicular to g. For example, the matrix g* may be defined as g*=[-g_2 g_1].

At step 912, the UE determines a first channel gain with respect to the first wireless device and a second channel gain with respect to the second wireless device. For example, with reference to FIG. 7, the UE1 704 may have n transmit antennas, the UE2 706 may have n receive antennas, and the AP 702 may have a single full-duplex antenna. The UE2 706 may determine an estimate of the channel gain between its intended transmitter (i.e., AP 702) and itself (i.e., UE2 706). Such channel gain may be represented by a matrix H. The UE2 706 may also determine an estimate of the channel gain between the uplink transmitter (i.e., UE1 704) and itself (i.e., UE2 706). Such channel gain may be represented by a matrix G. In an aspect, the UE2 706 may estimate the channel gains H and G by listening to one or more training signals transmitted by each of the transmitters UE1 704 and AP 702. For example, the matrix H may be defined as $$H = \begin{bmatrix} h_1 \\ h_2 \end{bmatrix}$$

and the matrix G may be defined as $$G = \begin{bmatrix} g_{11} & g_{12} \\ g_{21} & g_{22} \end{bmatrix}.$$

At step 914, the UE determines a subspace based on the first channel gain and the second channel gain. The subspace may be defined as $H^*(p \times gg^H + \sigma^2 I)^{-1}$, where H is the first channel gain, p is the power of the interfering signal, g is the second channel gain, $g^H$ is the Hermite conjugate of g, I is the identity matrix, and $\sigma^2$ is the variance of noise at a receiver. For example, if the UE2 706 has n receive antennas, l may represent a column vector of length n, and g may represent the product of matrix G and the vector l (i.e., g=G*l). For example, g may be defined as $$g = \begin{bmatrix} g_{11} + g_{12} \\ g_{21} + g_{22} \end{bmatrix} = \begin{bmatrix} g_1 \\ g_2 \end{bmatrix}.$$

At step 916, the UE reduces an interference of the received first signal caused by the interfering signal by projecting a matrix of the received signal onto a space associated with the interfering signal. In an aspect, the space may be the nullspace. In such aspect, in order to null the interference in the received signal y, the UE2 706 may multiply y by g*, where g*=[−$g_2$ $g_1$] as shown in equation (1). In another aspect, the space may be the subspace, the subspace being configured to increase a signal to interference-plus-noise ratio (SINR). In such aspect, the signal y received by UE2 706 may be represented as y=Hx+gs+z. The terms gs+z may be treated as noise with variance matrix $p \times gg^H + \sigma^2 I$. Therefore, the signal y may be multiplied by $H^*(p \times gg^H + \sigma^2 I)^{-1}$ to determine the MMSE estimator that maximizes the SINR of the downlink data signal 710.

Figure 10:
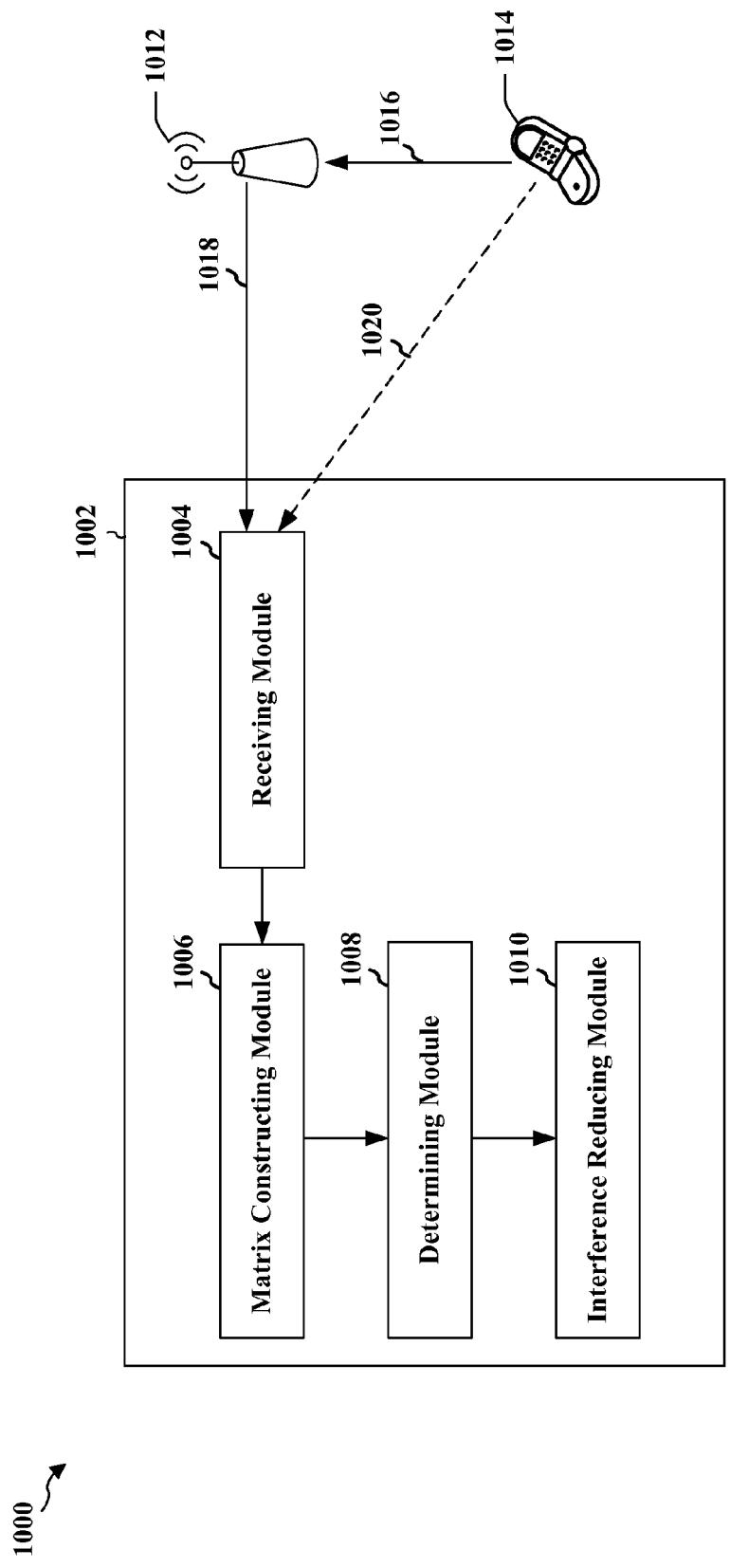
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE.

The apparatus includes a receiving module 1004. In an aspect, the receiving module 1004 receives an intended signal (e.g., downlink data signal 1018) from a first wireless device (e.g., AP 1012) operating in a full-duplex mode and receives an interfering signal (e.g., interfering signal 1020) from a second wireless device (e.g., UE 1014) communicating with the first wireless device. In one configuration, the interfering signal may be received concurrently with the received intended signal. In another configuration, the interfering signal and the received intended signal are received on the same carrier frequency. In another aspect, the receiving module 1004 receives a first signal from a first wireless device operating in a full-duplex mode and receives a second signal (e.g., interfering signal 1020) from a second wireless device communicating the second signal (e.g., uplink data signal 1016) to the first wireless device, the first wireless device receiving the second signal concurrently with transmitting the first signal on a same carrier frequency, the second signal being received concurrently with the first signal on the same carrier frequency, the second signal being an interfering signal.

The apparatus further includes a matrix constructing module 1006 that constructs the matrix based on a received plurality of signals. In an aspect, the received first signal includes the plurality of signals received from different sets of antennas of the first wireless device. In another aspect, the received intended signal includes the plurality of signals received from different sets of antennas of the first wireless device.

The apparatus further includes a determining module 1008. In an aspect, the determining module 1008 determines a channel gain with respect to the second wireless device and determines a nullspace based on the channel gain. In another aspect, the determining module 1008 determines a first channel gain with respect to the first wireless device and a second channel gain with respect to the second wireless device, and determines a subspace based on the first channel gain and the second channel gain.

The apparatus further includes an interference reducing module 1010. In an aspect, the interference reducing module 1010 reduces an interference of the received intended signal caused by the interfering signal by projecting a matrix of the received intended signal onto a space associated with the interfering signal. In one configuration, the space may be a nullspace. In another configuration, the space may be a subspace being configured to increase a signal to interference-plus-noise ratio (SINR). In another configuration, the space may be a subspace defined as $H^*(p \times gg^H + \sigma^2 I)^{-1}$. In another aspect, the apparatus reduces an interference of the received first signal caused by the interfering signal by projecting a matrix of the received signal onto a space associated with the interfering signal. In one configuration, the space may be a nullspace. In another configuration, the space may be a subspace being configured to increase a signal to interference-plus-noise ratio (SINR). In another configuration, the space may be a subspace defined as $H^*(p \times gg^H + \sigma^2 I)^{-1}$.

The apparatus may include additional modules that perform each of the steps of the algorithm in the aforementioned flow charts of FIGS. 8 and 9. As such, each step in the aforementioned flow charts of FIGS. 8 and 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
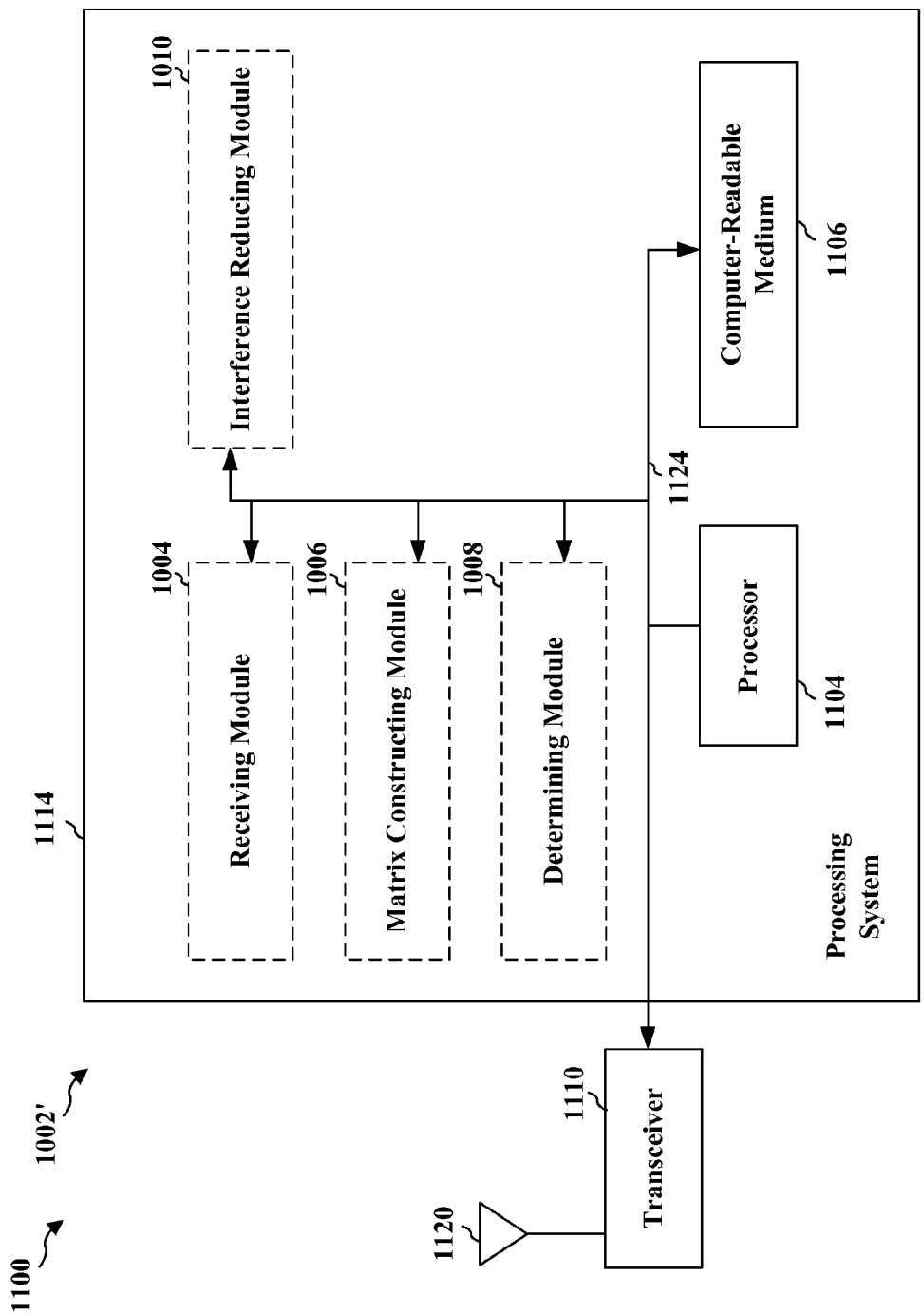
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, and 1010, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the receiving module 1004. In addition, the transceiver 1110 receives information from the processing system 1114, and based on the received information, generates a signal to be applied to the one or more antennas 1120. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, and 1010. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for receiving an intended signal from a first wireless device operating in a full-duplex mode, means for receiving an interfering signal from a second wireless device communicating with the first wireless device, means for reducing an interference of the received intended signal caused by the interfering signal by projecting a matrix of the received intended signal onto a space associated with the interfering signal, means for determining a channel gain with respect to the second wireless device, means for determining a nullspace based on the channel gain, means for determining a first channel gain with respect to the first wireless device and a second channel gain with respect to the second wireless device, and means for determining a subspace based on the first channel gain and the second channel gain, means for constructing the matrix based on the received plurality of signals, means for receiving a first signal from a first wireless device operating in a full-duplex mode, means for receiving a second signal from a second wireless device communicating the second signal to the first wireless device, the first wireless device receiving the second signal concurrently with transmitting the first signal on a same carrier frequency, the second signal being received concurrently with the first signal on the same carrier frequency, the second signal being an interfering signal, means for reducing an interference of the received first signal caused by the interfering signal by projecting a matrix of the received signal onto a space associated with the interfering signal.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication comprising:
   receiving an intended signal from a first wireless device operating in a full-duplex mode;
   receiving an interfering signal from a second wireless device communicating with the first wireless device;
   determining a first channel gain with respect to the first wireless device and a second channel gain with respect to the second wireless device;
   determining a subspace based on the first channel gain and the second channel gain; and
   reducing an interference of the received intended signal caused by the interfering signal by projecting a matrix of the received intended signal onto a space associated with the interfering signal,
   wherein the space is the subspace, the subspace being configured to increase a signal to interference-plus-noise ratio (SINR), and
   wherein the subspace is defined as $H^*(p \times gg^H + \sigma^2 I)^{-1}$,
   where H is the first channel gain, p is a power of the interfering signal, g is the second channel gain, $g^H$ is a Hermite conjugate of g, I is an identity matrix, and $\sigma^2$ is a variance of noise at a receiver.

2. The method of claim 1, wherein the interfering signal is received concurrently with the received intended signal, and wherein the interfering signal and the received intended signal are received on the same carrier frequency.

3. The method of claim 1, wherein the received intended signal comprises a plurality of signals received from different sets of antennas of the first wireless device, and the method further comprising constructing the matrix based on the received plurality of signals.

4. A method of wireless communication comprising:
   receiving a first signal from a first wireless device operating in a full-duplex mode;
   receiving a second signal from a second wireless device communicating the second signal to the first wireless device, the first wireless device receiving the second signal concurrently with transmitting the first signal on a same carrier frequency, the second signal being received concurrently with the first signal on the same carrier frequency, the second signal being an interfering signal;
   determining a first channel gain with respect to the first wireless device and a second channel gain with respect to the second wireless device;
   determining a subspace based on the first channel gain and the second channel gain; and
   reducing an interference of the received first signal caused by the interfering signal by projecting a matrix of the received signal onto a space associated with the interfering signal,
   wherein the space is the subspace, the subspace being configured to increase a signal to interference-plus-noise ratio (SINR), and
   wherein the subspace is defined as $H^*(p \times gg^H + \sigma^2 I)^{-1}$,
   where H is the first channel gain, p is a power of the interfering signal, g is the second channel gain, $g^H$ is a Hermite conjugate of g, I is an identity matrix, and $\sigma^2$ is a variance of noise at a receiver.

5. The method of claim 4, wherein the received first signal comprises a plurality of signals received from different sets of antennas of the first wireless device, and the method further comprising constructing the matrix based on the received plurality of signals.

6. An apparatus for wireless communication, comprising:
   means for receiving an intended signal from a first wireless device operating in a full-duplex mode;
   means for receiving an interfering signal from a second wireless device communicating with the first wireless device;
   means for determining a first channel gain with respect to the first wireless device and a second channel gain with respect to the second wireless device;
   means for determining a subspace based on the first channel gain and the second channel gain; and means for reducing an interference of the received intended signal caused by the interfering signal by projecting a matrix of the received intended signal onto a space associated with the interfering signal,
wherein the space is the subspace, the subspace being configured to increase a signal to interference-plus-noise ratio (SINR), and
wherein the subspace is defined as $H^*(p \times gg^H + \sigma^2 I)^{-1}$,
where H is the first channel gain, p is a power of the interfering signal, g is the second channel gain, $g^H$ is a Hermite conjugate of g, I is an identity matrix, and $\sigma^2$ is the variance of noise at a receiver.

7. The apparatus of claim 6, wherein the interfering signal is received concurrently with the received intended signal, and wherein the interfering signal and the received intended signal are received on the same carrier frequency.

8. The apparatus of claim 6, wherein the received intended signal comprises a plurality of signals received from different sets of antennas of the first wireless device, and the apparatus further comprising means for constructing the matrix based on the received plurality of signals.

9. An apparatus for wireless communication comprising:
means for receiving a first signal from a first wireless device operating in a full-duplex mode;
means for receiving a second signal from a second wireless device communicating the second signal to the first wireless device, the first wireless device receiving the second signal concurrently with transmitting the first signal on a same carrier frequency, the second signal being received concurrently with the first signal on the same carrier frequency, the second signal being an interfering signal;
means for determining a first channel gain with respect to the first wireless device and a second channel gain with respect to the second wireless device; and
means for determining a subspace based on the first channel gain and the second channel gain; and
means for reducing an interference of the received first signal caused by the interfering signal by projecting a matrix of the received signal onto a space associated with the interfering signal,
wherein the space is the subspace, the subspace being configured to increase a signal to interference-plus-noise ratio (SINR), and
wherein the subspace is defined as $H^*(p \times gg^H + \sigma^2 I)^{-1}$,
where H is the first channel gain, p is a power of the interfering signal, g is the second channel gain, $g^H$ is a Hermite conjugate of g, I is an identity matrix, and $\sigma^2$ is a variance of noise at a receiver.

10. The apparatus of claim 9, wherein the received first signal comprises a plurality of signals received from different sets of antennas of the first wireless device, and the apparatus further comprising means for constructing the matrix based on the received plurality of signals.

11. An apparatus for wireless communication comprising:
a receiving module configured to:
receive an intended signal from a first wireless device operating in a full-duplex mode; and
receive an interfering signal from a second wireless device communicating with the first wireless device;
a determining module configured to:
determine a first channel gain with respect to the first wireless device and a second channel gain with respect to the second wireless device; and
determine a subspace based on the first channel gain and the second channel gain; and an interference reducing module configured to reduce an interference of the received intended signal caused by the interfering signal by projecting a matrix of the received intended signal onto a space associated with the interfering signal,
wherein the space is the subspace, the subspace being configured to increase a signal to interference-plus-noise ratio (SINR), and
wherein the subspace is defined as $H^*(p \times gg^H + \sigma^2 I)^{-1}$,
where H is the first channel gain, p is a power of the interfering signal, g is the second channel gain, $g^H$ is a Hermite conjugate of g, I is an identity matrix, and $\sigma^2$ is a variance of noise at a receiver.

12. The apparatus of claim 11, wherein the interfering signal is received concurrently with the received intended signal, and wherein the interfering signal and the received intended signal are received on the same carrier frequency.

13. The apparatus of claim 11, wherein the received intended signal comprises a plurality of signals received from different sets of antennas of the first wireless device, and the apparatus further comprising a matrix constructing module configured to construct the matrix based on the received plurality of signals.

14. An apparatus for wireless communication comprising:
a receiving module configured to:
receive a first signal from a first wireless device operating in a full-duplex mode; and
receive a second signal from a second wireless device communicating the second signal to the first wireless device, the first wireless device receiving the second signal concurrently with transmitting the first signal on a same carrier frequency, the second signal being received concurrently with the first signal on the same carrier frequency, the second signal being an interfering signal;
a determining module configured to:
determine a first channel gain with respect to the first wireless device and a second channel gain with respect to the second wireless device; and
determine a subspace based on the first channel gain and the second channel gain; and
an interference reducing module configured to reduce an interference of the received first signal caused by the interfering signal by projecting a matrix of the received signal onto a space associated with the interfering signal,
wherein the space is the subspace, the subspace being configured to increase a signal to interference-plus-noise ratio (SINR), and
wherein the subspace is defined as $H^*(p \times gg^H + \sigma^2 I)^{-1}$,
where H is the first channel gain, p is a power of the interfering signal, g is the second channel gain, $g^H$ is a Hermite conjugate of g, I is an identity matrix, and $\sigma^2$ is a variance of noise at a receiver.

15. The apparatus of claim 14, wherein the received first signal comprises a plurality of signals received from different sets of antennas of the first wireless device, and the apparatus further comprising a matrix constructing module configured to construct the matrix based on the received plurality of signals.

16. A computer program product, comprising:
a non-transitory computer-readable medium comprising code for:
receiving an intended signal from a first wireless device operating in a full-duplex mode;
receiving an interfering signal from a second wireless device communicating with the first wireless device;

determining a first channel gain with respect to the first wireless device and a second channel gain with respect to the second wireless device;

determining a subspace based on the first channel gain and the second channel gain; and reducing an interference of the received intended signal caused by the interfering signal by projecting a matrix of the received intended signal onto a space associated with the interfering signal, wherein the space is the subspace, the subspace being configured to increase a signal to interference-plus-noise ratio (SINR), and wherein the subspace is defined as $H^*(p \times gg^H + \sigma^2)^{-1}$, where H is the first channel gain, p is a power of the interfering signal, g is the second channel gain, $g^H$ is a Hermite conjugate of g, I is an identity matrix, and $\sigma^2$ is a variance of noise at a receiver.

17. The computer program product of claim 16, wherein the interfering signal is received concurrently with the received intended signal, and wherein the interfering signal and the received intended signal are received on the same carrier frequency.

18. The computer program product of claim 16, wherein the received intended signal comprises a plurality of signals received from different sets of antennas of the first wireless device, and the computer-readable medium further comprising code for constructing the matrix based on the received plurality of signals.

19. A computer program product, comprising:
a non-transitory computer-readable medium comprising code for:
receiving a first signal from a first wireless device operating in a full-duplex mode;
receiving a second signal from a second wireless device communicating the second signal to the first wireless device, the first wireless device receiving the second signal concurrently with transmitting the first signal on a same carrier frequency, the second signal being received concurrently with the first signal on the same carrier frequency, the second signal being an interfering signal;
determining a first channel gain with respect to the first wireless device and a second channel gain with respect to the second wireless device;
determining a subspace based on the first channel gain and the second channel gain; and
reducing an interference of the received first signal caused by the interfering signal by projecting a matrix of the received signal onto a space associated with the interfering signal,
wherein the space is the subspace, the subspace being configured to increase a signal to interference-plus-noise ratio (SINR), and
wherein the subspace is defined as $H^*(p \times gg^H + \sigma^2 I)^{-1}$,
where H is the first channel gain, p is a power of the interfering signal, g is the second channel gain, $g^H$ is a Hermite conjugate of g, I is an identity matrix, and $\sigma^2$ is a variance of noise at a receiver.

20. The computer program product of claim 19, wherein the received first signal comprises a plurality of signals received from different sets of antennas of the first wireless device, and the computer-readable medium further comprising code for constructing the matrix based on the received plurality of signals.

* * * * *